United States Patent [19]

Hirano et al.

[11] Patent Number: 4,530,489

[45] Date of Patent: Jul. 23, 1985

[54] SPRING LOAD ADJUSTING DEVICE FOR CUSHIONING EQUIPMENT

[75] Inventors: Masahiro Hirano; Sumio Nakayama, both of Shizuoka, Japan

[73] Assignee: Kabushiki Kaisha Showa Seisakusho, Tokyo, Japan

[21] Appl. No.: 489,747

[22] Filed: Apr. 29, 1983

[30] Foreign Application Priority Data

May 17, 1982 [JP] Japan .............................. 57-71822[U]
May 17, 1982 [JP] Japan .............................. 57-71823[U]

[51] Int. Cl.³ .......................... F16F 5/00; F16F 9/44
[52] U.S. Cl. .................................... 267/34; 188/285; 267/61 S
[58] Field of Search .................. 74/528, 531; 188/285, 188/299, 300; 267/34, 61 S, 64.15

[56] References Cited

U.S. PATENT DOCUMENTS

| 1,310,199 | 7/1919 | Manton | 188/285 X |
| 2,161,070 | 6/1939 | McDonough | 74/531 |
| 2,516,771 | 7/1950 | Herscher et al. | 74/531 X |
| 2,718,285 | 9/1955 | Largay | 188/299 |
| 3,628,810 | 12/1971 | Graef | 267/34 X |

FOREIGN PATENT DOCUMENTS 1134565 12/1956 France ................................. 188/299

Primary Examiner—Duane A. Reger
Attorney, Agent, or Firm—Irving M. Weiner; Pamela S. Burt

[57] ABSTRACT

A spring load adjusting device for cushioning equipment including a pressure chamber which hydraulically controls a spring load of a coil spring.

A hydraulic cylinder is hydraulically connected to the pressure chamber, a piston is slidably fitted in the cylinder, an adjust screw is provided for sliding the piston, and a protection member is provided for protecting a threaded portion of the adjust screw.

The threaded portion of the adjust screw is protected from exposure to the outside and is thus protected from dust and the like, while the appearance is improved.

12 Claims, 4 Drawing Figures

SPRING LOAD ADJUSTING DEVICE FOR CUSHIONING EQUIPMENT

BACKGROUND OF THE INVENTION

1. Field of the Invention

The present invention relates to a spring load adjusting device for cushioning equipment.

2. Description of Relevant Art

There has been proposed, for example, by Japanese Utility Model Application Lay-Open Print No. 53-5948, a spring load adjusting device for cushioning equipment of a type in which a spring seat of a coil spring of an oil damper is slidably fitted on the outside circumference of a damper cylinder thereof and the spring seat is slidably moved with a hydraulic pressure supplied from a tank installed separately from the cylinder, thereby changing the set length of the coil spring to adjust the spring load thereof. The spring load adjustment device comprises the tank which is composed of a cylinder, a piston slidably fitted in the cylinder and an adjust screw extended from the piston outwardly of the cylinder and advanceably and retreatably screwed in a cap of the cylinder.

In such a spring load adjusting device, however, an adjust screw is exposed outside of a cylinder, thus marring the appearance. Further, there is a threaded portion exposed outside of the cylinder, which is disadvantageous in that dust and the like may adhere thereto.

The present invention has been achieved to effectively solve such problems in conventional spring load adjusting devices.

SUMMARY OF THE INVENTION

According to the present invention, there is provided a spring load adjusting device for cushioning equipment including a pressure chamber which hydraulically controls of a spring load of a spring, comprising a tank cylinder hydraulically connected to the pressure chamber, a piston member slidably fitted in the cylinder, a cap for closing the open end of the cylinder, an adjust screw member having a threaded portion, extending through the cap and being adapted by rotational operation thereof to cause the piston member to slide, and a knob integrally fastened with the outer end of the adjust screw member. The device further comprises means for protecting the threaded portion of the adjust screw member having a cylindrical wall extending axially along at least a part of the outer circumference of the threaded portion.

An object of the present invention is to provide a spring load adjusting device for cushioning equipment, in which an adjust bolt has the thread portion thereof protected from exposure to the outside, thus being protected from dust and the like and having a favorably improved appearance.

The above and further features, objects and advantages of the present invention will become apparent from the following detailed description of preferred embodiments of the invention when the same is read in conjunction with the accompanying drawings.

BRIEF DESCRIPTION OF THE ACCOMPANYING DRAWINGS

DETAILED DESCRIPTION OF THE PREFERRED EMBODIMENTS

Figure 1:
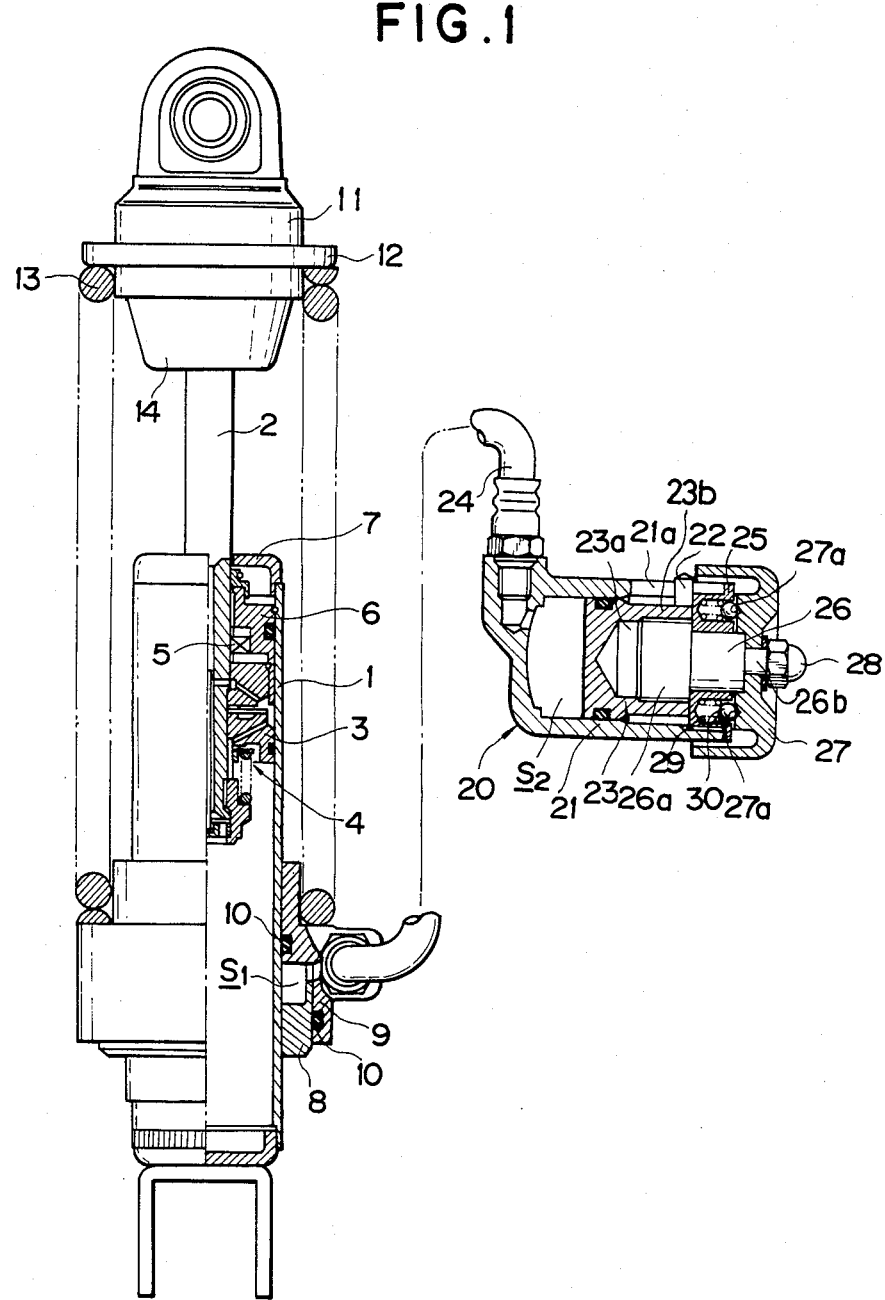
FIG. 1 is a longitudinal sectional view of a cushioning equipment having a spring load adjusting device according to a first embodiment of the invention.

Referring first to FIG. 1, designated at reference numeral 1 is a cylinder in which a piston rod 2 is inserted, the piston rod 2 being provided at one end thereof inside of the cylinder 1 with a piston 3 slidably fitted in the inner circumference of the cylinder 1. The piston 3 is provided with a valve mechanism 4 for producing a damping force.

The cylinder 1 has an open end closed with a cover member 7 and a rod guide 6 having fitted therein an oil seal 5 slidably fitted on the circumference of the piston rod 2. In the cylinder 1 there is sealed a hydraulic oil.

Fitted on an outer circumferential portion of the cylinder 1 is a fixed member 8 and a spring seat 9 is slidably fitted thereon while seating itself on respective circumferential portions of the cylinder 1 and the fixed member 8, and a hydraulic chamber S1 is defined between the fixed member 8 and the spring seat 9. Also provided is a seal ring 10.

The piston rod 2 has a portion 2a thereof extending outwardly of the cylinder 1 and having at the distal end thereof a metal joint member 11 fastened thereto, the joint member 11 being provided thereon with another spring seat 12 fitted to be secured thereto. Between spring seat 12 and the spring seat 9 there is interposed in a compressed manner a coil spring 13. Designated at 14 is a rubber stopper.

On the other hand, designated at reference numeral 20 is a tank arranged to be separate from the cylinder 1. The tank 20 has a cylinder 21 formed through the wall thereof with an elongated engagement slot 21a and a piston member 23 slidably fitted therein, the piston member 23 having projected on an outer circumferential portion thereof a projection 22 slidably engaged with the engagement slot 21a. The piston member 23 is formed therein with a hole 23a formed in the inner circumference of the cylindrical wall 23b thereof with female threads. Between the bottom of the piston member 23 and the inner wall of the cylinder 21 there is defined a hydraulic chamber S2 communicating through a leading tube 24 with the hydraulic chamber S1. These hydraulic chambers S1, S2 and the leading tube 24 are filled with the hydraulic oil.

The cylinder 21 has an open end closed with an upper cover 25 which is provided therethrough with an adjust bolt 26 facing the inside of the cylinder 21, the adjust bolt 26 being formed on one end portion thereof 26a with male threads. This end portion 26a of the adjust bolt 26 is rotatably screwed in the hole 23a of the piston member 23, so that the adjust bolt 26 is permitted to assume a fixed position relative to the cover 25.

Because the threaded portion 26a of the adjust bolt 26 is covered by the wall of the cylinder 21, the latter defines protection means for the former.

The adjust bolt 26 has a portion 26b thereof projecting outwardly of the cylinder 21, the portion 26b being provided with an adjust knob 27 integrally rotatably fastened thereto with a nut 28 screwed on the portion 26b of the adjust bolt 26. The adjust knob 27 is formed on the rear side thereof with slots 27a engaging with balls 30 resiliently biassed by means of springs 29 inlaid in the upper cover 25, thereby constituting a rotation check mechanism for the knob 27 and the adjust bolt 26.

When the adjust bolt 26 is rotated with the adjust knob 27, the piston member 23 engaged with the adjust bolt 26 but prevented from rotation by the projection 22, which is projected from the piston member 23 and engaged with the slot 21a, will slide in the cylinder 21. In the case where the piston member 23 advances (leftwardly in FIG. 1) for example, the hydraulic chamber S2 will have the oil pressure thereof raised and introduced through the leading tube 24 to the hydraulic chamber S1, pushing up the spring seat 9. As a result, the coil spring 13 will have the set length thereof compressed to be shorter and the spring load thereof adjusted to be higher. Conversely, when the piston member 23 is caused to retreat, the spring load of the coil spring 13 will be set lower.

In the above embodiment, when the adjust bolt 26 is rotated with the adjust knob 27, the adjust bolt 26 itself will not advance nor retreat but only the piston member 23 screwed thereon in the cylinder 21 will do so, so that the tank 20 has an outside configuration kept constant irrespective of the spring load adjustment and no unnecessary projection of component parts is found on the outside, thus providing a spring load adjusting device which is favorably improved in appearance.

Moreover, the tank 20 has the screwed portion of thread thereof completely accommodated therein, thus enabling the spring load adjusting device to be kept stable over a long period of use.

Figure 2:
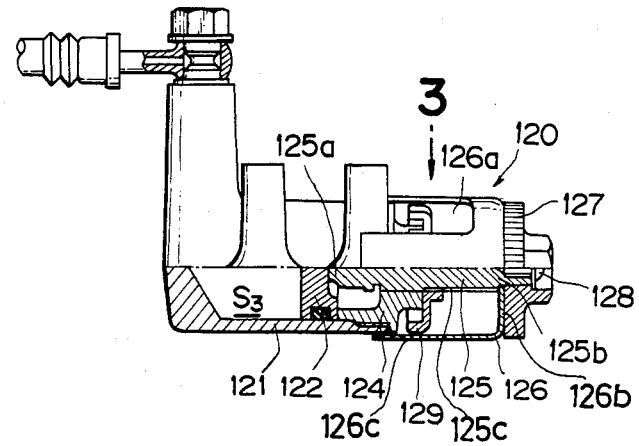
FIG. 2 is a longitudinal half-sectional view of a spring load adjusting device according to a second embodiment of the invention.
Figure 3:
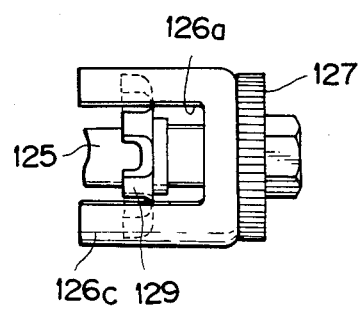
FIG. 3 is a side view of an essential portion of the spring load adjusting device of FIG. 2.
Figure 4:
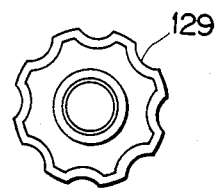
FIG. 4 is a front view of a lock plate of the spring load adjusting device of FIG. 2.

Referring now to FIGS. 2 to 4, particularly with reference to FIG. 2, designated at reference numeral 120 is a tank installed separately with respect to a cylinder of an oil damper (not shown). The tank 120 is provided therein with a cylinder 121 having a piston member 122 slidably fitted therein. Between the bottom of the piston member 122 and the inner wall of the cylinder 121, there is defined a hydraulic chamber S3.

The cylinder 121 has an open end closed with an upper cover 124 which is provided with an adjust bolt 125 screwed thereto while extending therethrough, the adjust bolt 125 being formed on the outer circumference in the intermediate portion thereof with threads 125c and having a lower portion 125a abutting at the end thereof with the piston member 122. The adjust bolt 125 has an upper portion 125b projecting outwardly of the cylinder 121, the upper portion 125b being covered with a cylindrical wall 126c of a cover 126 and having at the end thereof an adjust knob 127 fastened thereto with a screw 128 so as to be integrally rotatable with the adjust bolt 125.

Because the threads 127c of the adjust bolt 125 are covered by the cylindrical wall 126c of the cover 126, the latter defines protection means for the former.

The cover 126 is supported at the base end of the cylindrical wall 126c with a flanged portion 126b fitted on the adjust bolt 125 between the threaded portion 125c and the adjust knob 127 and is slidably fitted at the lower end of the cylindrical wall 126c on the outer circumference of the cylinder 121 as shown in FIG. 2. Formed in the cylindrical wall 126c is a cut hole 126a as shown in FIG. 3.

The upper portion 125b of the adjust bolt 125 covered with the cover 126 has on the outer circumference thereof a lock plate 129 screwed thereto for preventing the adjust bolt 125 from becoming loose. When the lock plate 129 is tightened firm at a position where it abuts with the upper cover 124 as shown in FIG. 2, the bolt 125 will become fixed to be integral with the upper cover 124, thus being prevented from rotation. Conversely, after lock plate 129 is manually rotated by fingers inserted through the cut hole 126a to thereby release the adjust bolt 125 from the rotation lock, the adjust bolt 125 when rotated will advance and retreat relative to the cylinder 121. With the advance and retreat of the adjust bolt 125, the piston member 122 in abutment with the lower end of the adjust bolt 125 will also advance and retreat, respectively.

After the adjustment of the spring load, when the lock plate 129 as abutted with the upper cover 124 is tightened firm, the adjust bolt 125 will again become locked against rotation, without any fear that vibrations and the like may cause the adjust bolt 125 to rotate gradually with a spring load varying from the setting.

We claim:

1. A spring load adjusting device for cushioning equipment including a hydraulic damper having a cylinder and a rod with a piston, a coil spring extending between said cylinder and said rod, and a pressure chamber provided at one end of said coil spring, said pressure chamber hydraulically controlling a spring load of said coil spring, comprising:
   a tank cylinder hydraulically connected to said pressure chamber;
   a piston member slidably fitted in said tank cylinder;
   a cover for closing an open end of said tank cylinder;
   an adjust screw member having a threaded portion, extending through said cover and being adapted by rotating operation thereof to cause said piston member to slide;
   a knob integrally fastened with the outer end of said adjust screw member;
   protection means for protecting said threaded portion of said adjust screw member;
   said protection means comprising a cylindrical wall extending axially along at least a part of the outer circumference of said threaded portion;
   said threaded portion being formed in an inner end portion of said adjust screw member extending in said tank cylinder; and
   said cylindrical wall of said protection means being integrally formed with said piston member and screwed on said threaded portion of said adjust screw member.

2. A device according to claim 1, wherein: said cylindrical wall is formed on the outer circumference thereof with a projection; and said projection is slidably engaged with a slot formed through a wall of said tank cylinder, thereby restricting the rotation of said piston member.

3. A spring load adjusting device for cushioning equipment including a hydraulic damper having a cylinder and a rod with a piston, a coil spring extending between said cylinder and said rod, and a pressure chamber provided at one end of said coil spring, said pressure chamber hydraulically controlling a spring load of said coil spring, comprising:
   a tank cylinder hydraulically connected to said pressure chamber;
   a piston member slidably fitted in said tank cylinder;
   a cover for closing an open end of said tank cylinder;
   an adjust screw member having a threaded portion, extending through said cover and being adapted by rotating operation thereof to cause said piston member to slide;
a knob integrally fastened with the outer end of said adjust screw member;
protection means for protecting said threaded portion of said adjust screw member;
said protection means comprising a cylindrical wall extending axially along at least a part of the outer circumference of said threaded portion; and
a detent mechanism of said adjust screw member interposed between said knob and said cover.

4. A device according to claim 3, wherein: said detent mechanism comprises a plurality of grooves formed in the rear face of said knob, a plurality of balls laid in the front face of said cover, and a plurality of springs each biassing any of said balls to the engagement direction relative to any of said grooves.

5. A spring load adjusting device for cushioning equipment including a hydraulic damper having a cylinder and a rod with a piston, a coil spring extending between said cylinder and said rod, and a pressure chamber provided at one end of said coil spring, said pressure chamber hydraulically controlling a spring load of said coil spring, comprising:
a tank cylinder hydraulically connected to said pressure chamber;
a piston member slidably fitted in said tank cylinder;
a cover for closing an open end of said tank cylinder;
an adjust screw member having a threaded portion, extending through said cover and being adapted by rotating operation thereof to cause said piston member to slide;
a knob integrally fastened with the outer end of said adjust screw member;
protection means for protecting said threaded portion of said adjust screw member;
said protection means comprising a cylindrical wall extending axially along at least a part of the outer circumference of said threaded portion;
said threaded portion being formed in the intermediate portion of said adjust screw member and advanceably and retreatably screwed in said cover; and
said cylindrical wall of said protection means having at the base end thereof a flange fitted to be supported between said threaded portion of said adjust screw member and said knob.

6. A device according to claim 5, wherein: said cylindrical wall has the distal end thereof slidably fitted on the outer circumference of said tank cylinder.

7. A spring load adjusting device for cushioning equipment including a hydraulic damper having a cylinder and a rod with a piston, a coil spring extending between said cylinder and said rod, and a pressure chamber provided at one end of said coil spring, said pressure chamber hydraulically controlling a spring load of said coil spring, comprising:
a tank cylinder hydraulically connected to said pressure chamber;
a piston member slidably fitted in said tank cylinder;
a cover for closing an open end of said tank cylinder;
an adjust screw member having a threaded portion, extending through said cover and being adapted by rotating operation thereof to cause said piston member to slide;
a knob integrally fastened with the outer end of said adjust screw member;
protection means for protecting said threaded portion of said adjust screw member;
said protection means comprising a cylindrical wall extending axially along at least a part of the outer circumference of said threaded portion;
said threaded portion of said adjust screw member being provided with a lock plate screwed thereon between said cover and said knob.

8. A device according to claim 7, wherein: said cylindrical wall is partially formed therethrough with a cut hole.

9. A device according to claim 1, further comprising:
a detent mechanism of said adjust screw member interposed between said knob and said cover.

10. A device according to claim 2, further comprising:
a detent mechanism of said adjust screw member interposed between said knob and said cover.

11. A device according to claim 5, wherein:
said threaded portion of said adjust screw member is provided with a lock plate screwed thereon between said cover and said knob.

12. A device according to claim 6, wherein:
said threaded portion of said adjust screw member is provided with a lock plate screwed thereon between said cover and said knob.

* * * * *